United States Patent [19]

Davlin

[11] Patent Number: 4,555,129
[45] Date of Patent: Nov. 26, 1985

[54] ADAPTER UNION AND IMPROVED ADAPTER MEMBER THEREFOR

[76] Inventor: Irwin H. Davlin, 714 S. Court St., Opelousas, La. 70570

[21] Appl. No.: 614,215

[22] Filed: Aug. 15, 1984

Related U.S. Application Data

[63] Continuation of Ser. No. 214,959, Dec. 9, 1980, abandoned.

[51] Int. Cl.[4] .............................................. F16L 37/10
[52] U.S. Cl. .......................................... 285/3; 285/93;
285/158; 285/286; 285/334.4; 285/354;
285/422
[58] Field of Search ................. 285/334.4, 5 L, 158,
285/3, 4, 93, 422, 354, 286; 138/44

[56] References Cited

U.S. PATENT DOCUMENTS

| | | | |
|---|---|---|---|
| 796,644 | 8/1905 | Hayden | 285/354 X |
| 954,549 | 4/1910 | Turner | 285/334.4 X |
| 1,756,417 | 4/1930 | Woodhead | 285/422 X |
| 1,966,403 | 7/1934 | Durham | 285/286 X |
| 2,915,324 | 12/1959 | Jackson | 285/DIG. 7 |
| 3,516,692 | 6/1970 | Albrecht | 285/158 X |
| 3,653,694 | 4/1972 | Nicol | 285/334.4 |
| 4,139,022 | 2/1979 | Marmon | 138/44 |
| 4,216,558 | 8/1980 | Schultz | 285/93 X |

FOREIGN PATENT DOCUMENTS 18148 10/1980 European Pat. Off. ............. 285/93

Primary Examiner—Dave W. Arola
Attorney, Agent, or Firm—L. S. Van Landingham, Jr.

[57] ABSTRACT

An adapter union is disclosed which is especially useful for installation by butt welding on containers for fluids to permit a conduit of smaller internal diameter to be removably attached thereto, and also for certain other specialized uses described herein. The adapter union includes an improved butt weld adapter member. When desired, the adapter member may be installed on containers for fluids by butt welding to thereby permit a conduit of smaller diameter to be attached directly thereto. The disclosure further relates to containers for fluids having the adapter union and/or the adapter member installed thereon. When the adapter union is installed properly, the resultant structure provides for permanency of the installation when desired, and also allows future changes and modifications to be made easily and without damaging the adapter union and/or conduits or other cooperating apparatus attached thereto.

20 Claims, 32 Drawing Figures

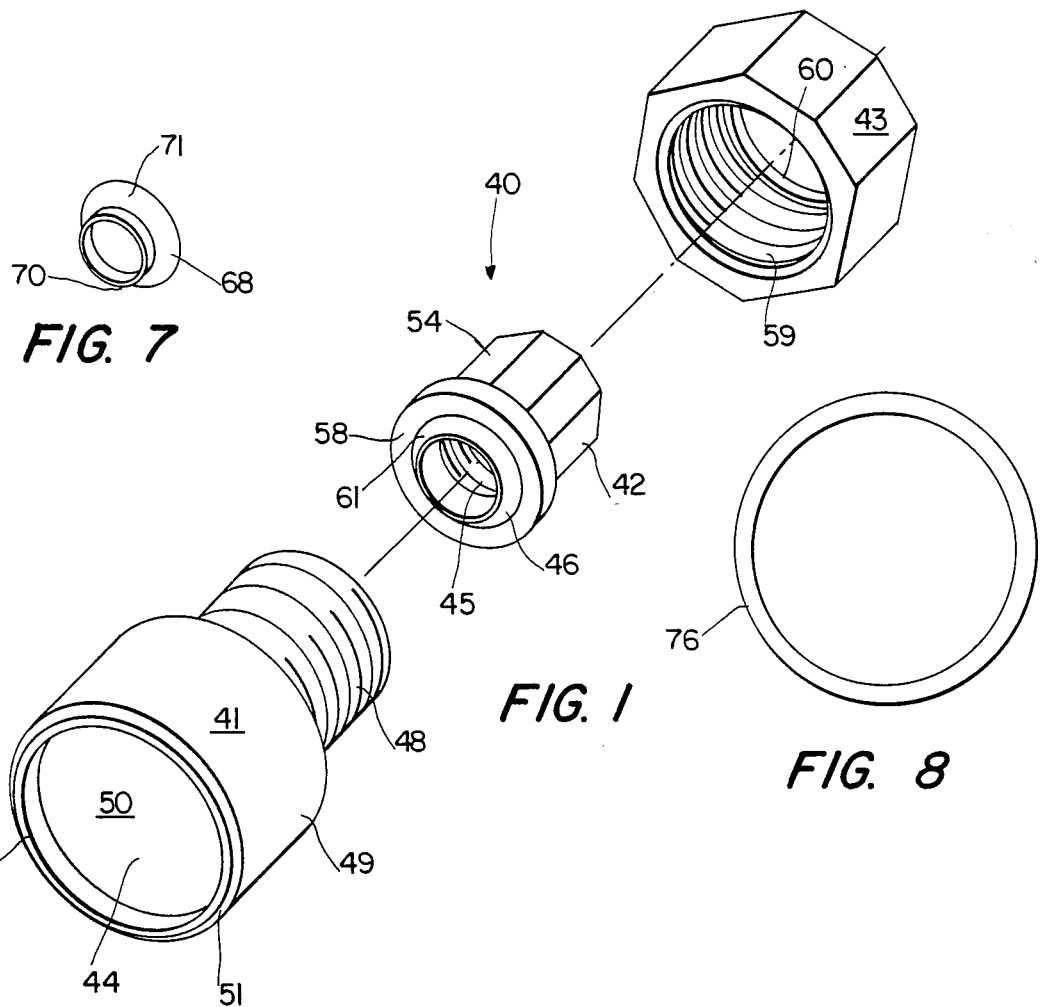
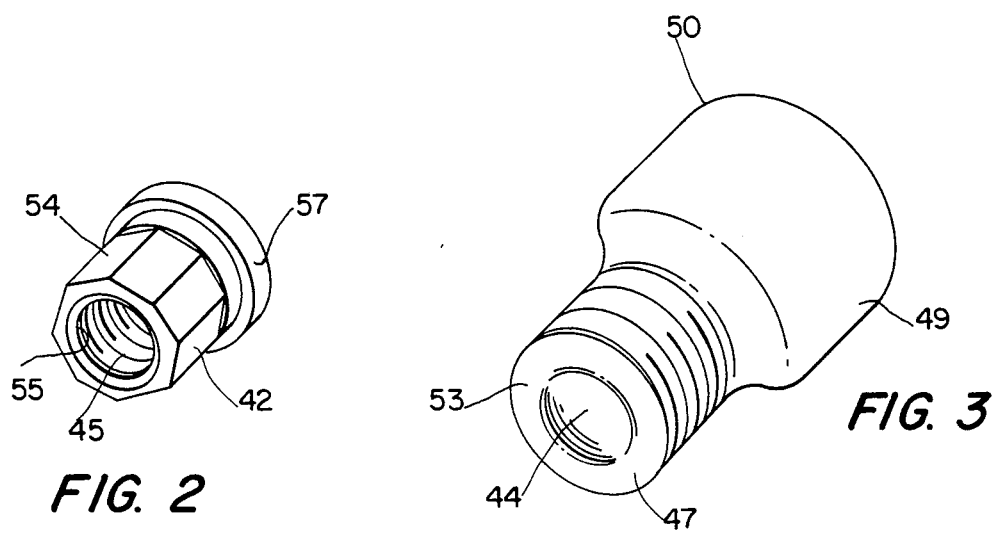

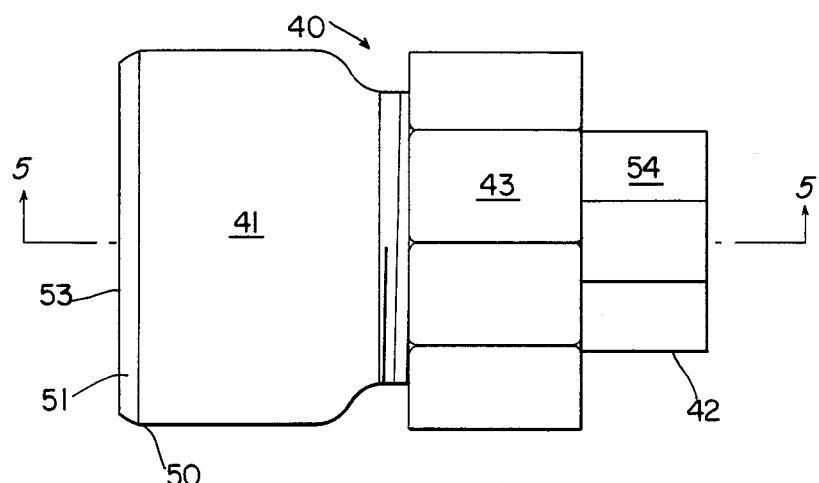
FIG. 4
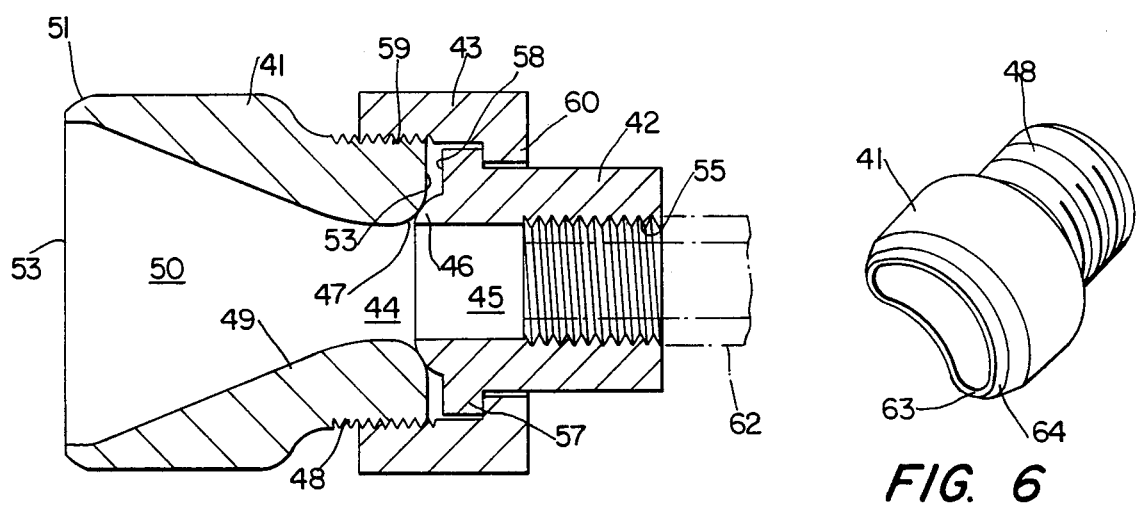
FIG. 5
FIG. 6
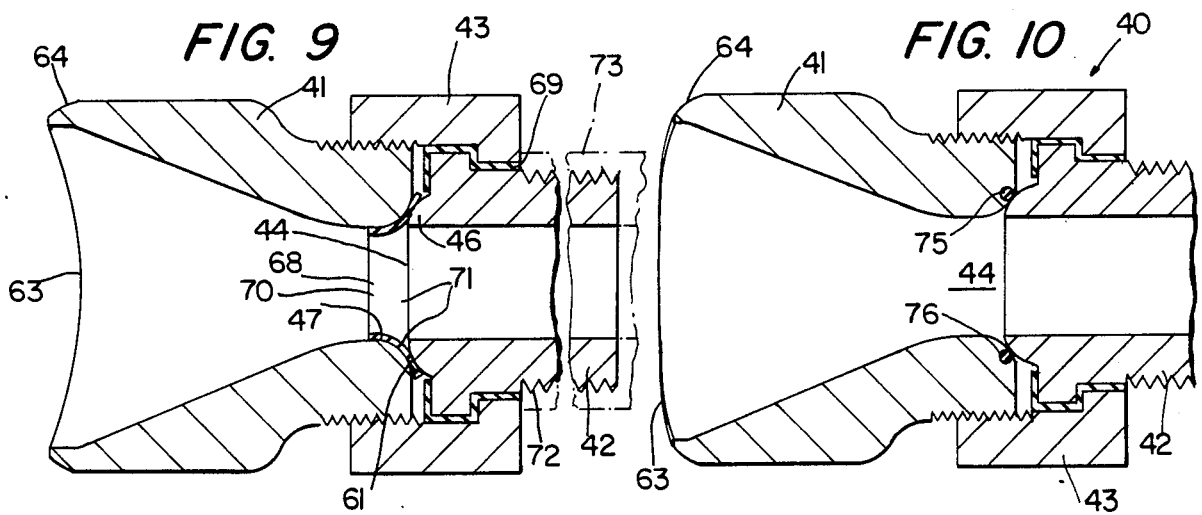
FIG. 9
FIG. 10

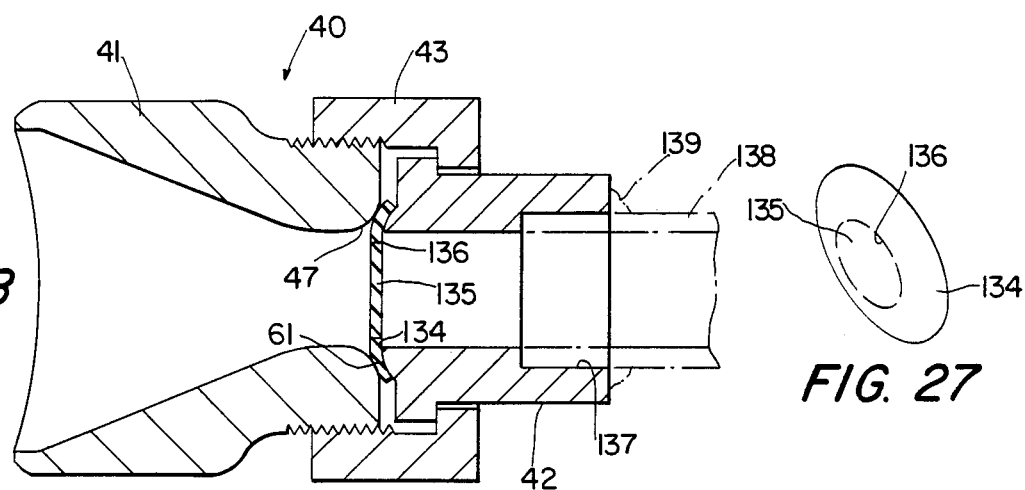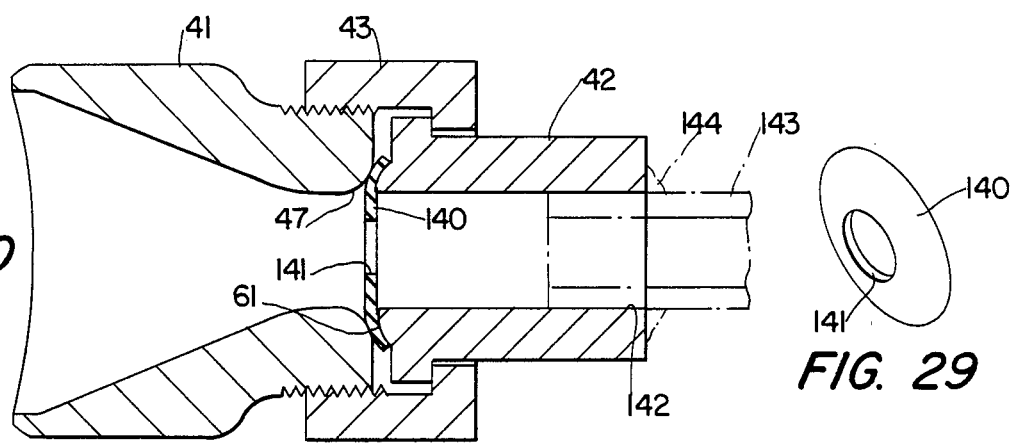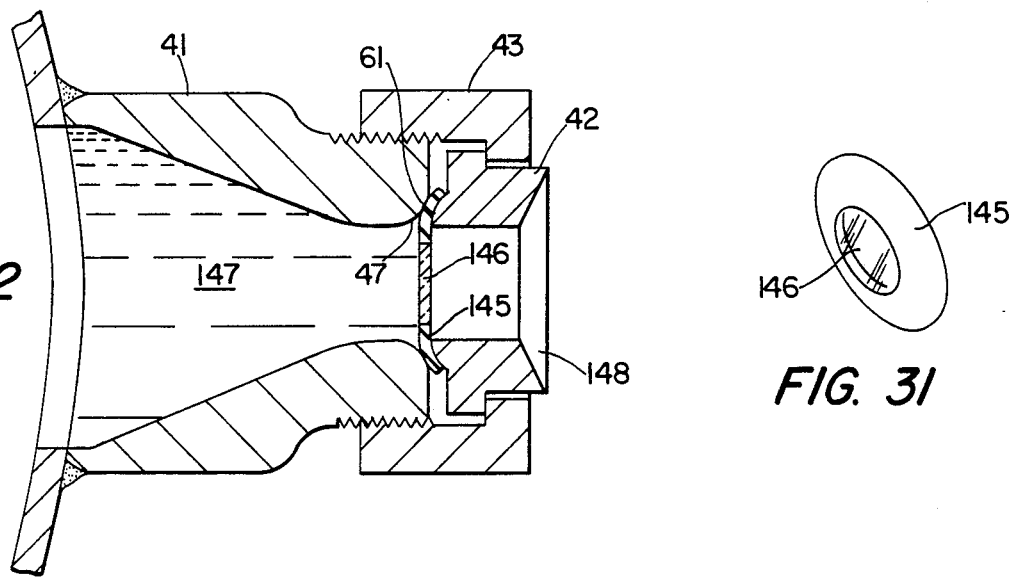

ADAPTER UNION AND IMPROVED ADAPTER MEMBER THEREFOR

This is a continuation application of application Ser. No. 214,959, filed Dec. 9, 1980, now abandoned.

THE BACKGROUND OF THE INVENTION

1. The Field Of The Invention

Th present invention relates to adapter unions for installation on containers for fluids to thereby permit a conduit of smaller internal diameter to be removably attached thereto. The invention further provides an improved adapter member which may be installed on containers for fluids to permit a conduit of smaller internal diameter to be attached directly thereto. The invention is also concerned with containers for fluids having the adapter union or adapter member of the invention installed thereon, conduit joints including the adapter union and/or adapter member of the invention, and conduit systems for transporting fluids including a plurality of conduits which are interconnected with one or more of the adapter unions and/or adapter members of the invention.

2. The Prior Art

Fittings of the type commonly referred to as adapters or adapter unions have been used extensively heretofore on a wide variety of different types of containers for fluids, including tanks and vessels in general wherein fluids are stored passively, and pipes and conduits in general used in the transportation, distribution, and control of fluids. All of the above are referred to generically in the present specification and claims as being containers for fluids.

The prior art adapters or adapter unions include means for interconnecting containers for fluids having relatively large and small internal diameters. Thus, as a general rule, a sharp transition in flow rate and other factors occurs as fluid flows from a container for fluids having a relatively large internal diameter into a container for fluids having a relatively small internal diameter. The area of transition between the relatively large and small internal diameters creates a number of problems in actual practice, and especially in instances where the fluid is being transported continuously in large volume.

The adapters or adapter unions of the prior art are especially characterized by a high degree of turbulence in the throat area, i.e., the area where there is a rapid transition from a large diameter conduit to one having a relatively small diameter. This sharp increase in turbulence adversely affects the flow rate through the adapter or adapter unions, and in turn the overall efficiency of the piping system markedly. It also greatly increases the rate of errosion in the throat area. As a result, the adapter or adapter union tends to deteriorate at a higher rate than the remainder of the piping system and eventually it must be repaired or replaced. These factors are even more pronounced when a corrosive fluid is being transported, or when the system is under extremely high pressure, and/or when the fluid is being transported under conditions which create still further increased turbulence and rapid flow rates in the throat area. The safety factor becomes important as the errosion rate increases dramatically, and especially in high pressure systems. In such instances, it is especially desirable that the rate of deterioration of the adapter or adapter union be predictable so that it may be repaired or replaced periodically to prevent mechanical failure.

THE SUMMARY OF THE INVENTION

The present invention overcomes the aforementioned and other disadvantages and deficiencies of the prior art. This is accomplished by providing an adapter and/or an adapter union characterized by the novel and improved designs described and claimed hereinafter.

The adapter of the invention includes an elongated member having inner and outer termini. The elongated member has an opening extending longitudinally between the outer and inner termini to provide a passageway for fluid to flow therethrough. The longitudinally extending opening has a markedly larger internal diameter at the outer terminus than at the inner terminus. The opening tapers gradually from the larger internal diameter to the smaller internal diameter at an angle of about 20-30 degrees with the longitudinal axis of the opening. The wall of the elongated member increases in thickness between the outer and inner termini and this greatly increases the initial strength in the vicinity of the transition from the larger internal diameter to the smaller internal diameter. The elongated member includes a contoured surface adjacent the outer terminus for the purpose of adapting it to be permanently installed by welding around an opening in the wall of a first container for fluids. The installation is such that the opening in the elongated member is in communication with the interior of the first container. The elongated member includes means adjacent the inner terminus for attaching a second conduit for fluids thereto and the conduit interior is also in communication with the opening.

An adapter union is further provided which includes the above described adapter. The adapter member has inner and outer termini, and an opening extends longitudinally therethrough between the outer and inner termini. The opening has a markedly larger internal diameter at the outer terminus than at the inner terminus, and the opening tapers gradually from the larger to the smaller internal diameter at an angle of about 20-30 degrees with the longitudinal axis of the opening. The wall of the adapter member increases in thickness between the outer and inner termini, and this greatly increases the initial strength of the adapter member in the vicinity of the transition from the larger internal diameter to the smaller internal diameter. A conduit receiving member having inner and outer termini is provided and it has an opening extending therebetween which serves as a longitudinal passageway for fluid. The inner termini of the adapter member and the conduit receiving member include first and second pressure sealing means respectively around the openings therein. The first and second pressure sealing means cooperate to form a fluid tight seal therebetween, with the opening in the conduit receiving member being in communication with the opening in the adapter member, when force is applied to the adapter member and conduit receiving member in directions toward their respective inner termini. A releasable force applying means is carried by the adapter member and the conduit receiving member, for the purpose of releasably applying force thereto longitudinally in directions toward their respective inner termini. The first and second pressure sealing means are urged into a fluid tight sealing relationship when force is being applied thereto. The first and second pressure sealing means are rendered ineffective to form a fluid tight seal therebetween and the opening in the conduit receiving member is not in assured communication with the opening in the adapter member when force is no longer applied thereto. The adapter member includes contoured surface means adjacent the outer terminus thereof for adapting it to be permanently installed by welding around an opening in the wall of a container for fluids, with the opening in the adapter member being in communication with the interior of the container. The conduit receiving member includes means adjacent the outer terminus thereof for attaching a conduit for fluids, whereby the interior of the conduit is in communication successively with the opening in the conduit receiving member and then the opening in the adapter member.

THE BRIEF DESCRIPTION OF THE ACCOMPANYING DRAWINGS

The invention will be described hereinafter in greater particularity with reference to the presently preferred embodiments thereof illustrated in the accompanying drawings, wherein:

FIG. 1 is an exploded perspective view of the butt weld adapter union of the invention, which includes the butt weld adapter member of the invention as a component part;

FIG. 2 is a perspective outer end view of the conduit receiving member illustrated in FIG. 1;

FIG. 3 is a perspective inner end view further illustrating the female annular sealing surface on the adapter member of FIG. 1;

FIG. 4 is side view in elevation of the assembled adapter union of FIG. 1;

FIG. 5 is a longitudinal cross sectional view taken along the lines 5—5 of FIG. 4;

FIG. 6 is a perspective outer end view of a butt weld adapter member of the invention which is similar to that of FIG. 1, but having a modified configuration for the terminus on the outer end portion thereof;

FIG. 7 is a perspective view of an optional insert or replacement seat which may be used in combination with the components of the adapter union of the invention;

FIG. 8 is a perspective view of an optional O-ring sealing member which may be used in combination with the components of a modified butt weld adapter union of the invention;

FIG. 9 is a longitudinal cross sectional view similar to FIG. 5 illustrating the insert or replacement seat of FIG. 7 positioned in an assembled modified adapter union of the invention;

FIG. 10 is a longitudinal cross sectional view similar to FIG. 5, which further illustrates a modified adapter union of the invention including the O-ring sealing member of FIG. 8;

FIG. 27 is a perspective view of an optional pressure sensitive frangible insert which may be used in combination with the components of the adapter union of the invention for greater safety;

FIG. 28 is a longitudinal cross sectional view similar to FIG. 9, illustrating the safety insert of FIG. 27 positioned in an assembled modified adapter union of the invention;

FIG. 29 is a perspective view of an optional insert which may be used in combination with the components of the adapter union of the invention to restrict the normal flow rate;

FIG. 30 is a longitudinal cross sectional view similar to FIG. 9, illustrating the restricted flow insert of FIG. 29 positioned in an assembled modified adapter union of the invention;

Figure 11:
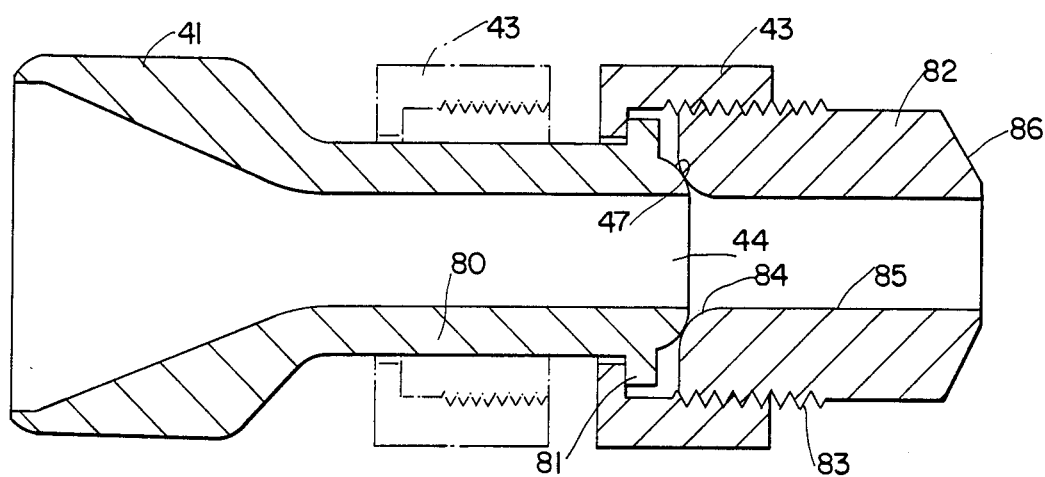
FIG. 11 is a longitudinal cross sectional view of a modified adapter union of the invention.

FIG. 31 is a perspective view of an optional transparent insert which may be used in combination with the components of the adapter union of the invention to provide visual access to the interior of a container for fluids; and FIG. 32 is a longitudinal cross sectional view similar to FIG. 9, but further illustrating the transparent insert of FIG. 31 positioned in an assembled modified adapter union of the invention.

The aforementioned figures of the drawings are referred to and discussed below in the detailed description of the invention. In the interest of simplifying the discussion, the same numerals are given to identical components and/or portions thereof throughout the various figures.

THE DETAILED DESCRIPTION OF THE INVENTION INCLUDING THE PRESENTLY PREFERRED VARIANTS AND EMBODIMENTS THEREOF

Referring now to FIGS. 1-5 of the drawings, the adapter union generally designated as 40 includes a butt weld adapter member 41, a conduit receiving member 42, and a coupling nut 43. The adapter member 41 and the conduit receiving member 42 have axially aligned longitudinally extending openings 44 and 45, respectively, which provide a passageway for fluid to flow through the adapter union 40. The inner end of opening 45 terminates in an annular protrusion 46, and the inner end of opening 44 terminates in an annular convex surface 47. As is best seen in FIG. 5, the annular protrusion 46 and the annular surface 47 constitute male and female pressure sealing surfaces, respectively, which cooperate to form a fluid tight seal when sufficient pressure or force is applied axially thereto.

The inner end of the adapter member 41 of FIGS. 1-5 is provided with external threads 48, and the wall 49 of the outer end portion is tapered outward therefrom to form an outer bell-shaped portion 50 having a greatly increased internal diameter which is in communication with opening 44. The outer end of wall 49 terminates in an annular bevel 51 which has a configuration adapted for butt welding when positioned against a suitable annular mating surface around an opening. The inner end of adapter member 41 has a flat annular terminal surface area 53 between the convex surface 47 and the circumference thereof.

The outer end of conduit receiving member 42 may have a hexagonal, octagonal or other suitably shaped surface 54 for holding with a tool. The opening 45 may be provided with internal threads 55 or other satisfactory conduit retaining means such as those described more fully hereinafter. The inner end may be provided with a shoulder 57, and it may terminate in a substantially flat annular area 58 which surrounds the annular protrusion 46.

The coupling nut 43 may have a hexagonal, octagonal or other suitably shaped surface for receiving a tool such as a wrench, and it is provided with internal threads 59. The outer end of coupling nut 43 preferably terminates in an unthreaded internal annular shoulder 60.

Referring now to FIGS. 4 and 5, which illustrate the assembled adapter union 40 of FIG. 1, it may be seen that the conduit receiving member 42 is inserted into the opening in coupling nut 43. The outer end portion 54 extends outward from the coupling nut 43 until the external shoulder 57 rests against the internal shoulder 60. As shown in phantom line, a conduit 62, which is externally threaded, may be mounted in end 54 in threaded engagement with threads 55. Internal threads 59 are in threaded engagement with the external threads 48 on the adapter member 41, and the coupling nut 43 is tightened sufficiently to urge the annular convex sealing surface 61 on protrusion 46 into tight sealing engagement with the annular convex sealing surface 47 to thereby form a fluid tight seal.

The adapter union 40 may be easily disassembled by reversing the above described steps of assembly. For instance, the coupling nut 43 may be loosened until the threads 59 are no longer in threaded engagement with threads 48. This allows the adapter member 41 to be removed, and thereafter the conduit receiving member 42 may be pushed inward until it falls free of the coupling nut 43. The above steps of assembly and disassembly may be repeated as frequently as desired as the component elements of the adapter union 40 are very durable.

Figure 18:
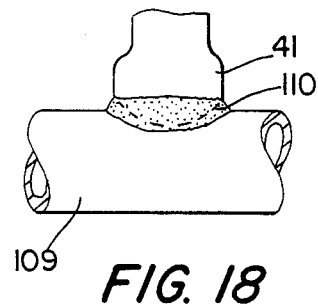
FIG. 18 is a side view in elevation of a straight section of pipe, with portions thereof being broken away, illustrating the installation of an adapter member or union of the invention around an opening in the wall thereof.
Figure 19:
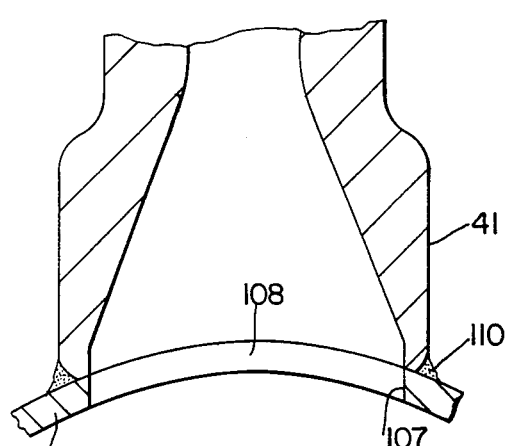
FIG. 19 is an enlarged cross-sectional view in elevation, with portions thereof being broken away, taken through the adapter member or union installed in the section of pipe in FIG. 18.
Figure 20:
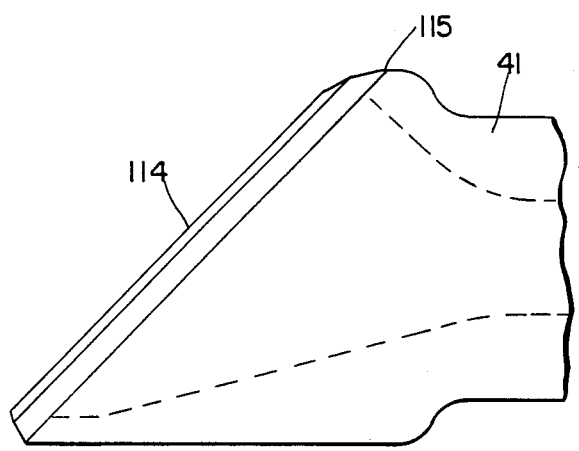
FIG. 20 is a fragmentary side view in elevation illustrating a modified configuration for the terminus on the outer ends of the butt weld adapter members or unions of FIGS. 1, 3–5, 11, 12, 14, 16 and 17.

FIGS. 1-5, 16 and 17 of the drawings illustrate one of the presently preferred embodiments of the adapter union 40 wherein the adapter member 41 has an outwardly tapered inner wall 49 which forms the internal bell-shaped outer portion 50, and which terminates in a flat annular terminus 53. It may be noted that a plane passing through the annular terminus 53 forms substantially a 90 degree angle with a plane passing through the longitudinal axis of the adapter union 40, and thus the annular terminus 53 and the welding bevel 51 are adapted to fit against a substantially flat surface. However, FIGS. 6, 9 and 10 illustrate a modification of the aforementioned flat annular terminus 53. In FIGS. 6, 9 and 10, the annular outer terminus 63 and the welding bevel 64 are contoured along a compound curve and have a configuration which conforms substantially with the contour around the opening in a curved external wall. Thus, an adapter union 40 having a terminus 63 and bevel 64 on member 41 may be placed on a curved outer external wall surface and permanently installed thereon by welding, as is illustrated in FIGS. 18 and 19. FIGS. 20 and 22 illustrate modified forms for the aforementioned annular terminus 53, and FIGS. 21 and 23-26 illustrate further modified forms for the aforementioned annular terminus 63. With the exception of the outer annular terminal ends, it is understood that the remaining portions of the adapter members 41 and adapter union 40, and the operation and use thereof, are identical with the previous description, and thus are not further described herein in order to avoid unnecessary repetition.

FIG. 9 of the drawings, which includes the adapter member 41 of FIG. 6, illustrates the use of an optional insert 68 and electrically insulating gasket 69. The insert 68 includes a generally cylindrical portion 70 which has an external diameter allowing it to be inserted into the opening 44 in a close fitting relationship, and an annular outwardly flared portion 71 which conforms with the convex surface 47. When the cylindrical portion 70 is inserted into opening 44, the annular protrusion 46 is forced against the flared portion 71 upon tightening the coupling nut 43, thereby forming a fluid-tight seal between the convex sealing surface 47, the surfaces of flared portion 71 and the convex sealing surfaces 61. This increases the effective life of the adapter union 40 as a fluid-tight seal may be formed when a fresh insert 68 is used and the nut 43 is tightened even when the sealing surface 61 on annular protrustion 46 and/or the sealing surface 47 are worn, scarred or otherwise will not form a fluidtight seal. Also, in instances where dissimilar metals are used which present a corrosion problem, the metal employed in the insert 68 is selected to be compatible with the two dissimilar metals and the electrically insulating gasket 69 is used to insulate the nut 43. The insert 68 may be of brass, steel, stainless steel and the like, and the composition is selected so as to be compatible with the metal or metals which are present in adapter member 41 and member 42. It may be noted that the conduit receiving member 42 of FIG. 1 has been modified to substitute male threads 72 for the female threads 55 of FIG. 1, whereby a conduit 73 threaded with female threads may be attached thereto as shown in phantom line.

FIG. 10 illustrates an adapter union 40 including a modified adapter member 41 which is similar to the adapter member 41 of FIGS. 6 and 9 with the exception of providing an annular recess 75 on its inner end portion for receiving the O-ring 76 illustrated in FIG. 8. The recess 75 and the O-ring 76 extend around the opening 44, and are arranged whereby the annular protrusion 46 is forced against the O-ring 76 in sealing relationship upon tightening the coupling nut 43 to thereby form both metal-to-metal and resilient seals. The O-ring 76 may be formed of butyl rubber or other suitable resilient materials which are commonly used for the manufacture of O-ring sealing members.

FIG. 11 of the drawings illustrates a modified form of the adapter union of the invention. The adapter member 41 of FIG. 11 includes an elongated inner end portion 80 which is provided with shoulder 81. The nut 43 is mounted on the inner end portion 80 and is slidable therealong, as is illustrated in phantom line. A conduit member 82 is provided with external threads 83 and has a convex sealing surface 84 on its inner end which is in sealing engagement with the convex sealing surface 47. The opening 85 extending longitudinally through conduit member 82 is in alignment with the opening 44 to thereby provide a passageway for fluid. The outer end of the conduit member 82 is provided with a welding bevel 86 having a configuration suitable for butt welding to another conduit. The nut 43 is in threaded engagement with threads 83 and, upon tightening the nut 43, the sealing surface 84 is urged into a tight sealing relationship with sealing surface 47. It is understood that the construction and operation of the adapter member 41 is as previously discussed for FIGS. 1-5 except as specifically noted above.

Figure 12:
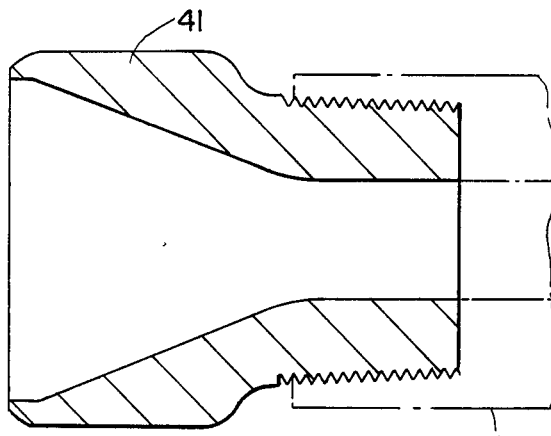
FIGS. 12 through 15 are cross sectional views of modified butt weld adapter members of the invention illustrating various modifications in the adapter member of FIG. 1.
Figure 13:
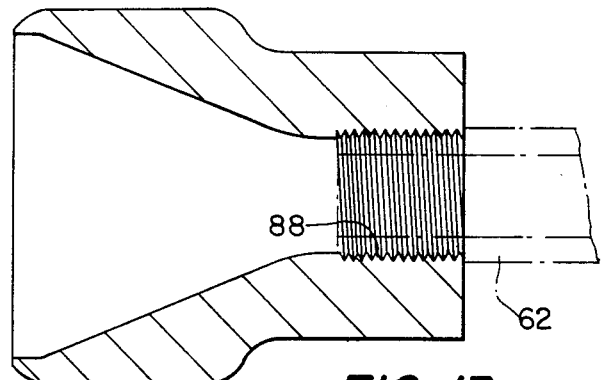
Figure 14:
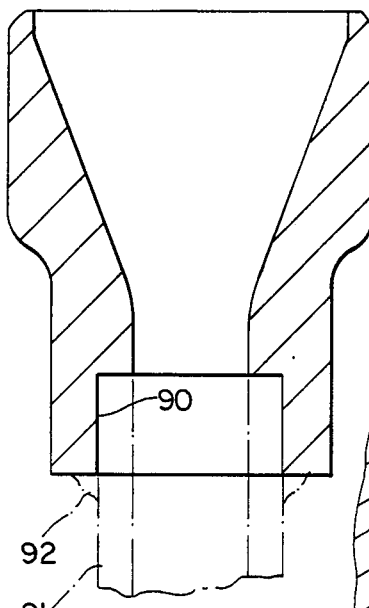
Figure 15:
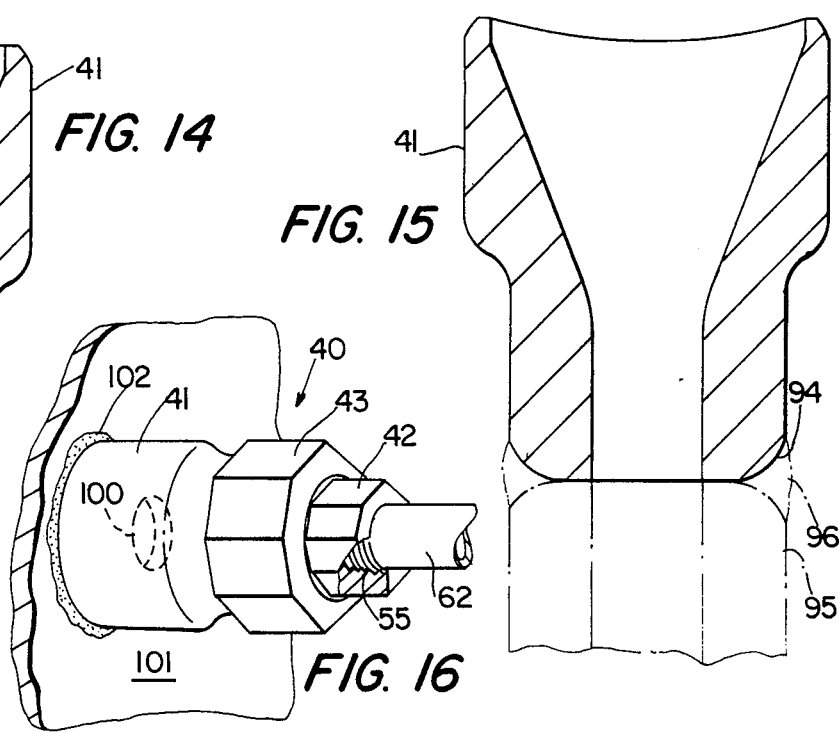

The adapter member 41 may be modified on its inner end in various ways to allow a conduit to be attached directly thereto. For example, FIG. 12 illustrates an internally threaded conduit 73 in phantom line in threaded engagement with the external threads 48 on the inner end of adapter member 41. Thus, the adapter member 41 may be joined directly to the conduit 73. Similarly, the adapter member 41 may be provided on its inner end with internal threads 88 as illustrated in FIG. 13. In this variant, an externally threaded conduit 52 may be conveniently attached threto as illustrated in phantom line in FIG. 13. In FIG. 14, the adapter member 41 is modified to provide a socket weld fitting 90 on its inner end. In this variant, the conduit 91 may be inserted into socket weld fitting 90 and permanently joined thereto by means of welding bead 92. The adapter member 41 of FIG. 15 is modified on its inner end to provide a welding bevel 94. As is illustrated in phantom line, the welding bevel 94 is useful in butt welding conduit 95 thereto by means of welding bead 96. It is understood that the adapter members 41 illustrated in FIGS. 12-15 are identical with the adapter member 41 of FIGS. 1-5 with the exceptions specifically mentioned.

Figure 16:
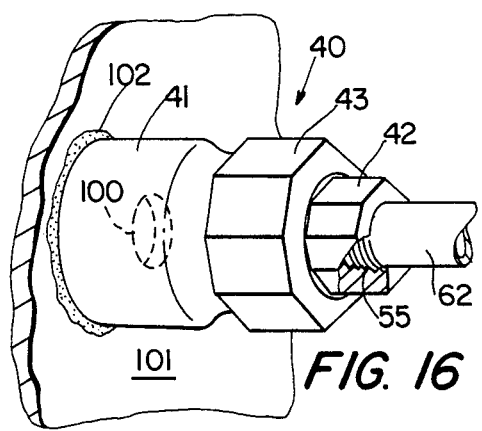
FIG. 16 is a perspective view illustrating the installation of the adapter union of FIG. 1 around an opening in the flat wall of a container for fluids, and further illustrating an externally threaded conduit therein and extending outwardly therefrom.

FIG. 16 of the drawings illustrates the installation of the adapter union 40 around the annular opening 100 in the flat wall 101 of a container for fluids. The fluid container may be, for example, a storage tank or vessel, a conduit or any other prior art vessel of a type conventionally used for storing or transporting desired fluids. The fluid present therein may be, for example, normally liquid substances such as water, petroleum distillates, and synthetic liquid organic compounds, or normally gaseous substances such as air, helium, nitrogen, oxygen, carbon dioxide, and gaseous hydrocarbons including methane, ethane and propane. Inasmuch as the adapter union 40 is very sturdy in construction, the fluid may be under a high pressure when desired. The term "fluids" is intended to include slurries, which are admixtures of solids and liquids, aerosols, which are admixtures of liquids or solids and gases, and emulsions, which are admixtures of a first liquid in a second liquid.

The bevel 51 forms a convenient welding throat when placed in position on the outer surface of flat wall 101 and around the circumference of the opening 100. When so positioned, the adapter union 40 may be permanently welded to the wall 101 without any difficulty. The bead of weld metal 102 assures a fluid tight seal between the adapter member 41 and the wall 101 in the vicinity of the opening 100. The adapter member 41 is permanently attached to the wall 101 with the opening 44 being in communication with the interior of the vessel means. However, it is possible to disassemble the adapter union 40 by loosening the coupling nut 43 until the internal threads 59 are no longer in threaded engagement with the external threads 48. Thereafter, the conduit receiving member 42, the conduit 62 having external threads 65 in fluid tight threaded engagement with the internal threads 55, and the coupling nut 43 may be separated from the adapter member 41. When desired, the conduit receiving member 42 may be removed from conduit 62 by turning in a direction to remove the internal threads 55 from threaded engagement. The described steps of disassembling the apparatus, and these steps in reverse order in assembling the apparatus, may be repeated as often as necessary.

Figure 17:
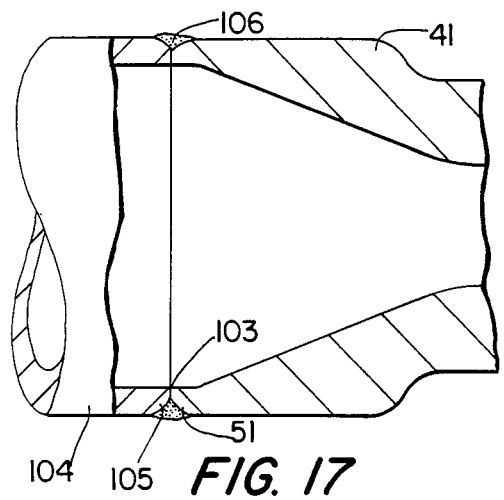
FIG. 17 is a view in elevation, partially in cross section and with portions thereof being broken away, illustrating the installation of an adapter member or union of the invention in the opening in the end of a pipe.

FIG. 17 of the drawings illustrates the installation of the adapter member 41 in the open end 103 of pipe 104. The annular bevel 51 forms a convenient welding throat when placed in position on the outer end 103 and against the end of the annular pipe wall which is also bevelled at 105. When so positioned the adapter member 41 may be permanently welded to the pipe 104 without any difficulty. The bead of weld metal 106 assures that a fluid tight seal is formed between the adapter member 41 and the pipe 104 in the vicinity of the opening 103. The adapter member 41 is permanently attached to the pipe 104 with the opening 44 being in communication with the interior of the pipe 104. However, it is still possible to assemble and disassemble the adapter union 40 following the same general procedure as discussed above for FIG. 16.

FIGS. 18 and 19 illustrate the installation of the adapter member 41 around the annular opening 107 in the curvi-linear wall or cylindrical wall 108 of a pipe or cylindrical storage vessel 109. As is best seen in FIG. 6, the terminus 63 is a compound curve and thus it conforms closely with the curvature of the outer surface of wall 108 thereby allowing the adapter member 41 to be easily mounted thereon. When so mounted, the annular terminus 63 and the annular bevel 64 may be permanently welded to the wall 108 without any difficulty. The bead of weld metal 110 assures that a fluid tight seal is formed between the adapter member 41 and the wall 108 in the vicinity of the opening 107. The adapter member 41 is attached to the wall 108 and the opening 44 is in communication with the interior of the pipe or cylindrical tank 109. However, it is still possible to assemble and disassemble the adapter union 40 following the general procedure discussed previously in connection with FIG. 16.

FIG. 20 is a fragmentary view illustrating a modified outer end 114 of adapter member 41 having an annular bevelled terminus 115. It may be noted that the annular bevelled terminus 115 is flat, and that a plane passing generally through the outer terminus 115 forms an acute angle with the longitudinal axis of the adapter union 40, such as 45 degrees. As is best seen in FIG. 22, the annular terminus 115 has a configuration which conforms with the contour of the substantially flat wall 116 around the opening 117. Thus, an adapter member 41 or union 40 including annular terminus 115 may be angularly mounted on the flat surface 116 around the opening 117 and permanently installed thereon is fluid-tight relationship by means of a welding bead 118.

Figure 21:
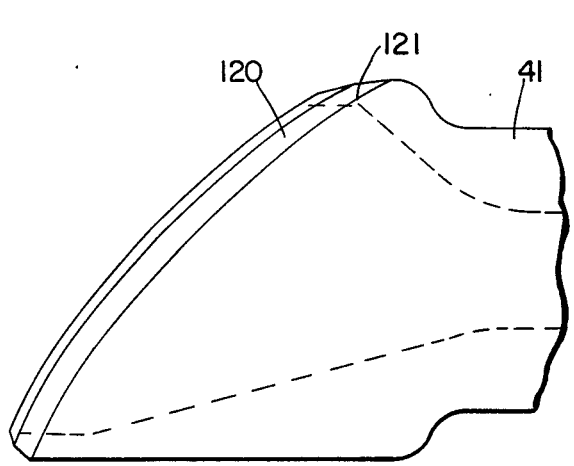
FIG. 21 is a fragmentary side view in elevation illustrating a modified configuration for the terminus on the outer ends of the butt weld adapter members or unions illustrated in FIGS. 6, 9, 10, 13, 14, 18 and 19.
Figure 22:
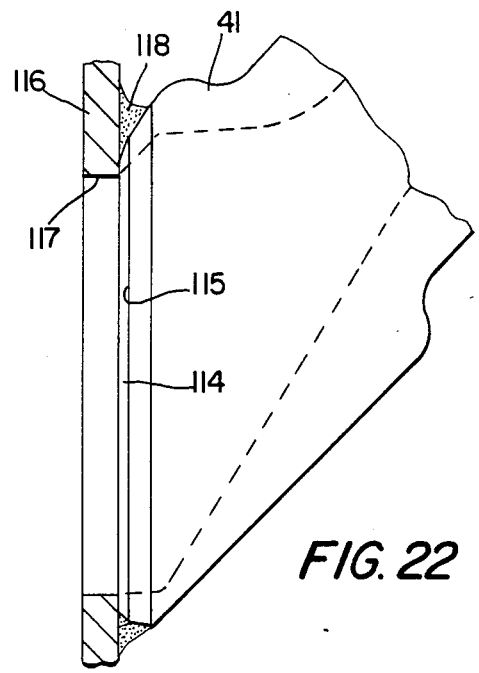
FIG. 22 is a fragmentary side view in elevation and partially in cross section, illustrating an adapter member or union in accordance with FIG. 20 installed at an angle around an opening in the flat wall of a container for fluids.

FIG. 21 is a fragmentary view illustrating a further modified outer end 120 of an adapter member 41 having a bevelled annular terminus 121. The bevelled annular terminus 121 is contoured along a compound curve, and in this respect is somewhat similar to the annular terminus 63 of the adapter member 41 in FIG. 6. However, it may be noted that a plane taken generally through the annular terminus 121 intersects the longitudinal axis of the adapter member 40 at an acute angle, such as 45 degrees. The annular terminus 121 has a configuration which conforms substantially with the contour around an opening in a container for fluids having a curved surface, such as is illustrated in FIGS. 23-26 of the drawings. Thus, an adapter union 40 including annular terminus 121 may be angularly mounted on a curved surface of a container for fluids.

Figure 23:
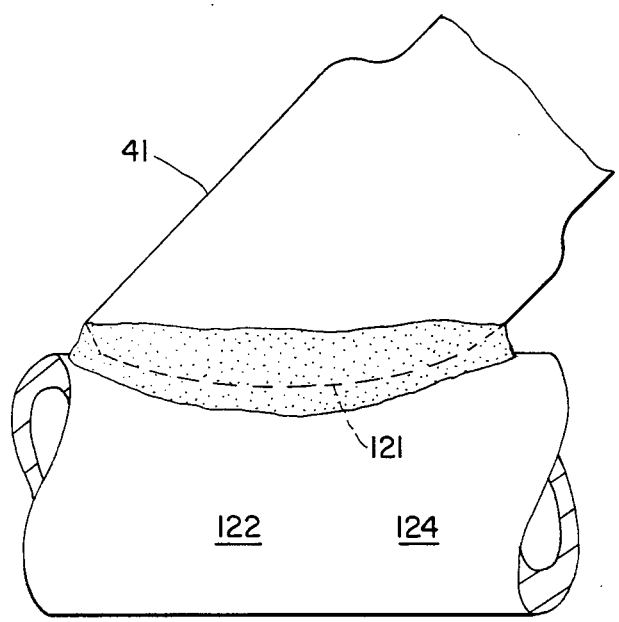
FIG. 23 is a fragmentary side view in elevation illustrating an adapter member or union having a terminus on the outer end in accordance with FIG. 21 installed at an angle around an opening in a straight section of pipe.
Figure 24:
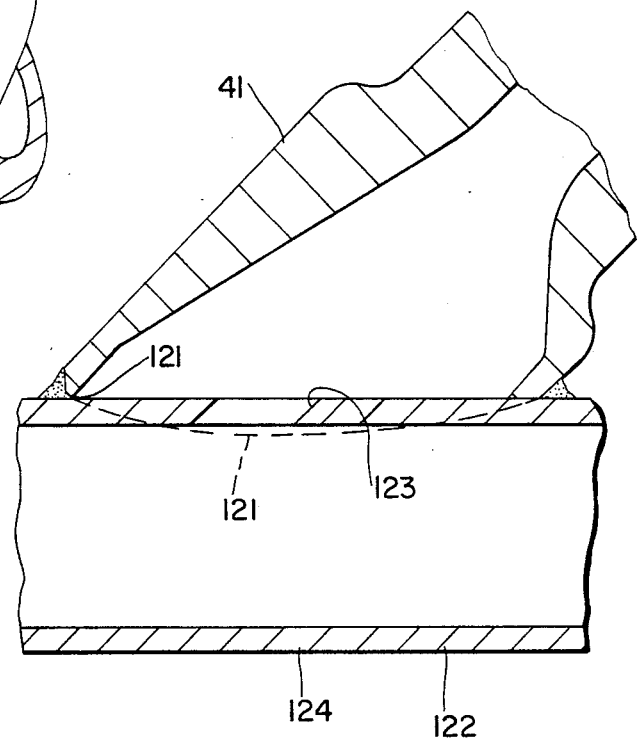
FIG. 24 is a longitudinal cross sectional view of FIG. 23.

FIGS. 23 and 24 are fragmentary views which illustrate an adapter member 41 including annular terminus 121 installed on a section of pipe 122 having an opening 123 in wall 124. It may be noted that the annular terminus 121 is angularly positioned on the curved outer surface around the opening 123 and is permanently attached to wall 124 in fluid-tight relationship by means of the weld bead 125. The surface of the annular terminus 121 has a configuration which conforms with the outer surface around the opening 123, and thus the adapter member 41 may be mounted thereon without any difficulty. The mounted adapter member 41 extends outward from the wall surface at an acute angle, such as 45 degrees.

Figure 25:
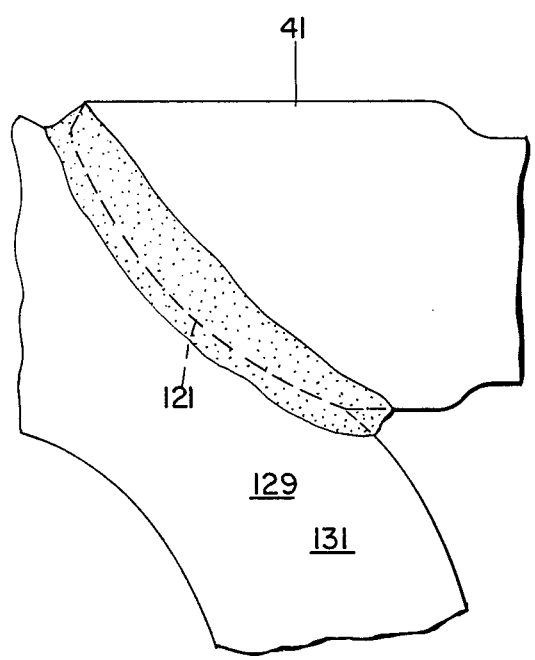
FIG. 25 is a fragmentary side view in elevation illustrating an adapter member or union having a terminus on the outer end similar to that illustrated in FIG. 21 installed at an angle around an opening in a bend or elbow of a pipe.
Figure 26:
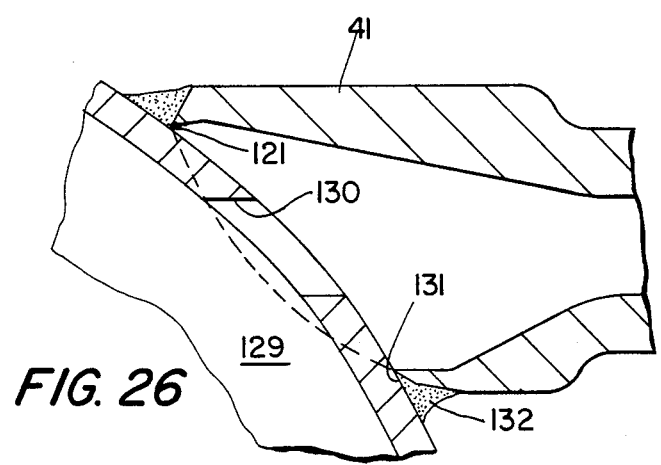
FIG. 26 is a longitudinal cross sectional view of FIG. 25.

FIGS. 25 and 26 are fragmentary views illustrating an adapter member 41 including annular terminus 121 angularly mounted on the outer surface of a 90 degree elbow 129. The elbow 129 has an opening 130 in the wall 131 thereof, and the annular terminus 121 has a configuration which conforms with the outer surface around the opening 130. Thus, an adapter member 41 including annular terminus 121 may be easily positioned on the surface of wall 131 as it closely conforms thereto, and then it may be permanently attached to the wall 131 in fluid-tight relationship by means of welding bead 132.

FIG. 28 illustrates a modification somewhat similar to FIG. 9. In this embodiment, a frangible insert 134 having a weakened annular portion 135 is positioned between the sealing surfaces 47 and 61 as previously discussed for insert 68 of FIG. 9. The frangible insert 134 prevents the flow of fluids through the adapter union 40 under normal pressure conditions. In the event that the pressure within the conduit system increases to an unacceptably high level, then the weakened portion 135 ruptures and fluid escapes through the resultant opening 136 until the pressure is reduced to an acceptable level. Conduit receiving member 42 is modified to provide a socket weld fitting 137. As is illustrated in phantom line, the conduit 138 is positioned in socket fitting 137 and retained therein by means of weld bead 139.

The embodiment illustrated in FIG. 30 is similar to that illustrated in FIG. 28, with the exception of substituting the restricted flow insert 140 for the insert 134, and modifying the conduit receiving member 42 to provide a slip-on fitting 142. As is illustrated in phantom line, the slip-on fitting 142 receives conduit 143 and it is permanently attached thereto by means of weld beads 144. The insert 140 is provided with an opening 141 which restricts the rate of flow of fluid through the adapter union 40. Any desired rate of flow may be maintained by selecting an insert 140 having an opening 141 of the proper internal diameter.

FIG. 32 illustrates a further modification of the adapter union. An insert 145 having a transparent annular center portion 146 is positioned between the sealing surfaces 47 and 61 as previously discussed for FIGS. 28 and 30. The conduit receiving member 42 is modified by reducing its length and providing a bevel 148 having a configuration adapted to serve as a peephole. The adapter member 41 is normally filled with fluid 147, and the condition thereof may be observed by placing the eye on bevel 148 and looking through the transparent portion 146. This embodiment of the invention is unique, and it is a marked departure from the traditional use of adapter unions merely for joining conduits.

The adapter member 41 is preferably prepared from a hot forging as additional unusual and unexpected results are achieved thereby. For instance, it has been found that the metalurgical grain structure of the resultant adapter member 41 runs generally longitudinally therethrough. In turn, the grain structure tends to run in the same general direction as the longitudinal opening. Surprisingly, the corrosion resistance of the metal along the surface of the internal diameter of the opening is increased very substantially, and this tends to decrease the corrosion rate. It has also been found that when the rough forging is machined, the metal is removed in layers parallel to the grain structure, and that the grain structure is not exposed. Additionally, in instances where the adapter member 41 is welded at its ends, such as at the outer terminus 53, then the weld metal tends to seal off the grain structure and this adds still additional corrosion resistance unexpectedly.

The longitudinally extending opening in the adapter member 41 has a markedly larger internal diameter at the outer terminus than at the inner terminus. The opening tapers gradually from the larger internal diameter to the smaller internal diameter at an angle of about 20-30 degrees, preferably about 23-25 degrees, and for best results usually at about 24 degrees with the longitudinal axis of the opening. It has been found that this angle of taper gives unusually good results in that turbulence in the throat area is controlled effectively, and at the same time manufacturing demands are met for the forging and machining steps used in preparing and finishing the adapter member. It may be noted that the thickness of the wall 49 increases markedly between the outer and inner termini of adapter member 41. This increase in wall thickness occurs as the turbulence is likewise increasing. The resultant increase in wall thickness also greatly increases the strength of the adapter member 41 in the vicinity of the transition from the larger internal diameter to the smaller internal diameter. The life of the adapter member 41 is extended greatly, and it is not necessary to replace the adapter member 41 at frequent intervals.

Upon reference to FIGS. 19–26 of the drawings, it may be noted that the numeral 41 may refer to either the adapter per se, such as is illustrated in FIGS. 12-15 of the drawings, or the adapter union of the invention illustrated in FIGS. 1–11, 28, 30 and 32 of the drawings. Thus, the adapter per se and the adapter union both are very versatile and may be used for a variety of different purposes. However, it is preferred to employ the adapter union in instances where there is a possibility of a need for entering the conduit at a future date.

It is also possible to provide a resilient sealing means in combination with the line metal-to-metal seal. For instance, one or more resilient seals may be located outside of the site of the primary metal-to-metal seal, and especially between the areas 53 and 58. The areas 53 and 58 may have annular opposed channels and resilient packing to thereby provide a resilient second seal.

The adapter and/or adapter union of the invention may be installed on various types of containers for fluids. They also may be used in joining a plurality of conduits, and/or in conduit systems for transporting fluids wherein a plurality of conduits are interconnected with one or more of the adapter unions and/or adapter members of the invention.

The configuration of the metal sealing surfaces is such that an annular metal-to-metal line seal of minimum surface area is formed closely adjacent the internal diameter of the opening through the adapter member 41. Much less total force or pressure need be applied to the opposed sealing surface to achieve a desired sealing pressure. Also, male-female sealing surfaces are provided which mate adjacent to the internal diameter of the opening through the adapter member 41, and the union is thus self-aligning.

The opening in the wall of a container for fluids which permits access thereto may be made either before or after installing the adapter union 40. For instance, as is illustrated in FIGS. 19 and 22, the large openings 107 and 117 may be made prior to installing the adapter union 40. However, as is illustrated in FIGS. 24 and 26, it is possible to first install the adapter member 41 by welding, and then insert a drill therethrough and drill the small openings 123 and 130. Thereafter, the remaining components of the adapter union 40 are assembled and/or disassembled as previously discussed.

The external threads 48 and the internal threads 59 are preferably, but not necessarily, of the "V" or Acme "straight" design. Thus, the coupling nut 43 may be tightened as much as desired to thereby apply sufficient pressure to force the annular protrusion 46 into a fluid-tight sealing relationship with annular surface 61, or when the insert 68 is in place as illustrated in FIG. 9, to force the annular protrusion 46 against the insert 68 and apply sufficient pressure thereto to form a fluid-tight seal between the surface 61 of protrusion 46, the surfaces of insert 68, and the annular surface 47.

While the surface 61 of annular protrusion 46 and annular surface 47 are presently preferred as pressure sealing surfaces for forming a fluid-tight seal, it is understood that other suitable prior art types of seats or sealing surfaces suitable for pressure sealing may be used. Additionally, while the coupling nut 43 carried by adapter member 41 and the conduit receiving member 42 are presently preferred as the means for applying pressure to the sealing surfaces, it is understood that other suitable prior art types of pressure applying means may be employed for this purpose.

The internal threads 55 in the conduit receiving member 42 may be, but are not necessarily, pipe threads.

The containers for fluids and the components of the adapter and adapter union of the invention are usually constructed of metal. However, it is understood that suitable plastics may be used in some instances when desired. Examples of metals include steel, stainless steel, brass, copper, aluminum, and alloys commonly used in this art such as monel nickel, cupro-nickel, inconel, incoloy and hastelloy. Examples of plastics include polyethylene, polypropylene, ABS copolymers, and the like. The fluids which may be stored in the aforementioned containers include those previously discussed in connection with FIG. 16 and it is understood that the fluids may be under high pressure when desired.

The foregoing detailed description and the accompanying drawings are for purposes of illustration only, and are not intended as being limiting to the spirit or scope of the appended claims.

I claim:

1. An adapter union comprising an adapter member having inner and outer termini, the adapter member having an opening extending longitudinally between the said outer terminus thereof and the said inner terminus thereof to thereby provide a passageway for fluid to flow longitudinally therethrough, the said longitudinally extending opening in the adapter member having a markedly larger internal diameter at the outer terminus than at the inner terminus and tapering gradually from the said larger internal diameter to the said smaller internal diameter at an angle of about 20°-30° with the longitudinal axis of the said opening therein and then increasing in internal diameter adjacent the inner terminus to thereby form an annular convex sealing surface thereon, the wall of the said adapter member increasing markedly in thickness between the said outer and inner termini thereof to thereby greatly increase the initial strength of the adapter member in the vicinity of the transition from the said larger internal diameter to the said smaller internal diameter, a conduit receiving member having inner and outer termini, the conduit receiving member having an opening extending between the said inner terminus thereof and the said outer terminus thereof to thereby provide a passageway for fluid to flow longitudinally therethrough, the said inner terminus of the adapter member including first pressure sealing means around the said opening therein comprising said annular convex sealing surface thereon, the said inner terminus of the conduit receiving member including second pressure sealing means around the opening therein comprising an annular convex sealing surface thereon the said first and second pressure sealing means cooperating to form a fluid tight seal therebetween with the opening in the conduit receiving member being in communication with the opening in the adapter member when force is applied to the adapter member and conduit receiving member longitudinally in directions toward their respective inner termini, releasable force applying means carried by the adapter member and the conduit receiving member for releasably applying force thereto longitudinally in directions toward their respective inner termini, the said first and second pressure sealing means being urged into a fluid tight sealing relationship and the opening in the conduit receiving member being in communication with the opening in the adapter member when the said force is being applied thereto, the said first and second pressure sealing means including said annular convex sealing surfaces whereby the resultant minimized surface area, the said first and second pressure sealing means being rendered ineffective to form a fluid tight seal therebetween and the opening in the conduit receiving member being out of assured communication with the opening in the adapter member when the said force is no longer being applied thereto, the adapter member including contoured surface means adjacent the outer terminus thereof for adapting it to be permanently installed by welding around an opening in the wall of a container for fluids with the said opening in the adapter member being in communication with the interior of the said container for fluids, and the conduit receiving member including means adjacent the outer terminus thereof for attaching a conduit for fluids thereto whereby the interior of the said conduit is in communication successively with the said opening in the conduit receiving member and the said opening in the adapter member.

2. The adapter union of claim 1 wherein the adapter member is prepared from a hot forging and the metallurgical grain structure runs generally longitudinally therethrough whereby the grain structure tends to run in the same general direction as the said longitudinal opening and the corrosion resistance of the metal along the surface of the internal diameter of the opening is increased.

3. The adapter union of claim 1 wherein the outer terminus of the adapter member is substantially flat and has a configuration which conforms substantially with the contour around an opening in a flat external wall surface of a container for fluids whereby the adapter member may be mounted around the said opening in the flat external wall surface and permanently installed thereon.

4. The adapter union of claim 3 wherein a plane passing generally through the outer terminus of the adapter member forms an acute angle with the longitudinal axis of the adapter union whereby the adapter union may be angularly installed on the wall of a container for fluids.

5. The adapter union of claim 1 wherein the outer terminus of the adapter member is contoured along a compound curve and has a configuration which conforms substantially with the contour around an opening in a curved external wall surface of an annular container for fluids whereby the adapter member may be mounted around the said opening in the curved external wall surface and permanently installed thereon.

6. The adapter union of claim 5 wherein a plane passing generally through the outer terminus of the adapter member forms an acute angle with the longitudinal axis of the adapter union whereby the adapter union may be angularly installed on the wall of a container for fluids.

7. The adapter union of claim 1 wherein the said means for attaching a conduit to the outer terminus of the conduit receiving member includes a butt weld fitting.

8. The adapter union of claim 1 wherein the said means for attaching a conduit to the outer terminus of the conduit receiving member includes a socket weld fitting.

9. The adapter union of claim 1 wherein the said means for attaching a conduit to the outer terminus of the conduit receiving member includes threads for receiving the cooperating threaded end of a conduit in threaded relationship.

10. The adapter union of claim 1 wherein the said means for attaching a conduit to the outer terminus of the conduit receiving member includes a slip-on fitting.

11. The adapter union of claim 1 wherein said first and second pressure sealing means include an insert formed from a material softer than the said convex sealing surfaces and is positioned therebetween.

12. The adapter union of claim 11 wherein the said insert has an opening therein which is sufficiently large to allow substantially unrestricted flow of fluid through the adapter union.

13. The adapter union of claim 11 wherein the said insert has an opening therein which is sufficiently small to restrict the flow of fluid through the adapter union to a desired rate which is less than the normal flow rate.

14. The adapter union of claim 11 wherein the said insert includes frangible means which prevents the flow of fluid through the adapter member under normal operating pressure, and the said frangible means is ruptured when the fluid pressure exceeds a predetermined pressure level thereby allowing fluid to flow through the said adapter union.

15. The adapter union of claim 11 wherein the said insert includes transparent or translucent means which prevents the flow of fluid through the adapter union, and the condition of the fluid in the adapter union may be viewed through the said transparent or translucent means.

16. The adapter union of claim 1 wherein at least one annular resilient sealing means is positioned around the said first and second pressure sealing means.

17. The adapter union of claim 1 wherein the said taper from the said larger to the smaller internal diameter is at an angle of about 24 or 25 degrees.

18. The adapter union of claim 1 wherein a first container for fluids is provided, the first container for fluids has wall means having interior and exterior surfaces defining the interior and exterior of the first container for fluids respectively, the wall means has an opening therethrough which permits communication between the said interior and exterior surface means, and the said adapter union is installed by welding on the interior surface around the said opening in the wall means.

19. The adapter union of claim 18 wherein a second conduit for fluids is provided, and the said second conduit for fluids is attached to the said outer terminus of the conduit receiving member by the said attending means therefor to thereby provide a conduit joint between the said first and second conduits for fluids.

20. The adapter union of claim 19 wherein at least one of the said conduit joints is installed in a conduit system for transporting fluids.

* * * * *